Dec. 5, 1950  H. SANDEN  2,532,948
DETACHABLE TRACTOR CAB
Filed Nov. 15, 1946  3 Sheets-Sheet 1
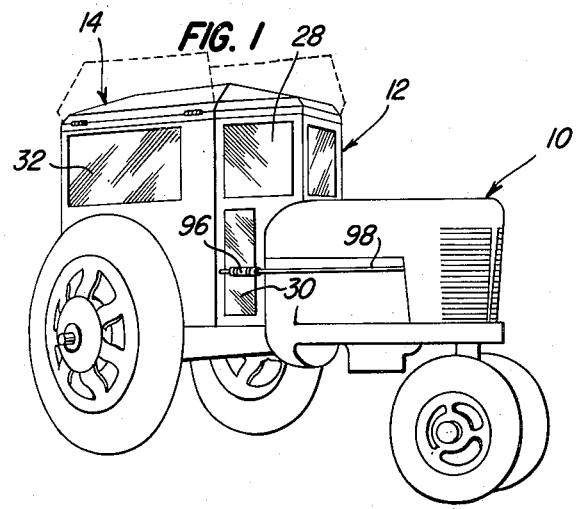
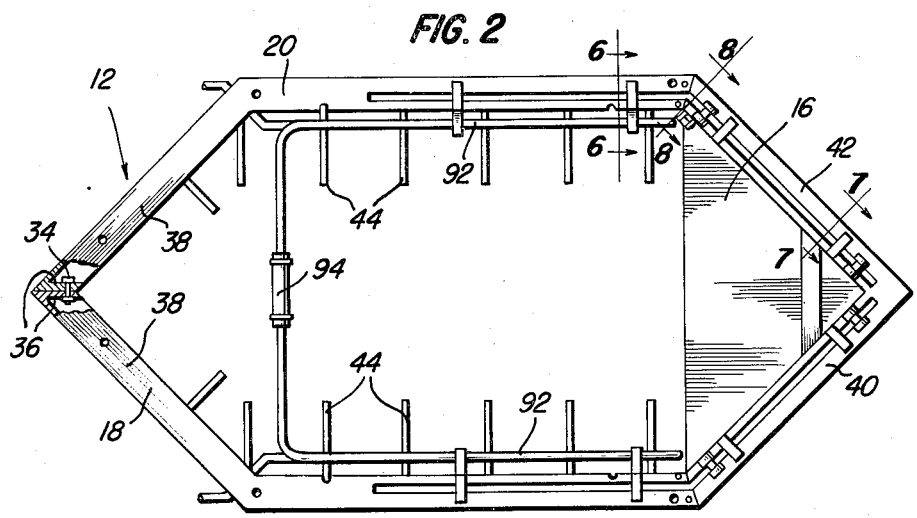
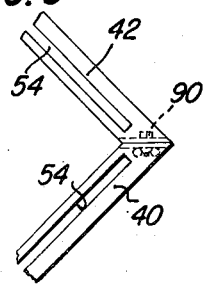
Inventor
HOWARD SANDEN
By *Clarence A. O'Brien
and Harvey B. Jacobson*
Attorneys Dec. 5, 1950  H. SANDEN  2,532,948
DETACHABLE TRACTOR CAB
Filed Nov. 15, 1946  3 Sheets-Sheet 2
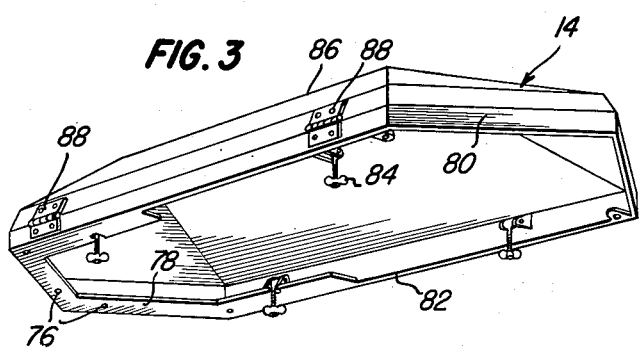
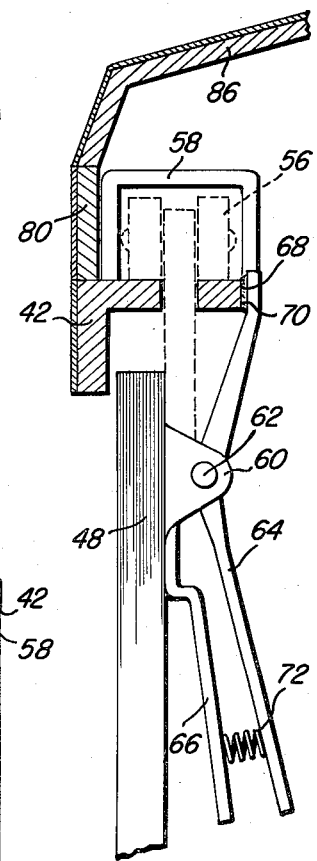
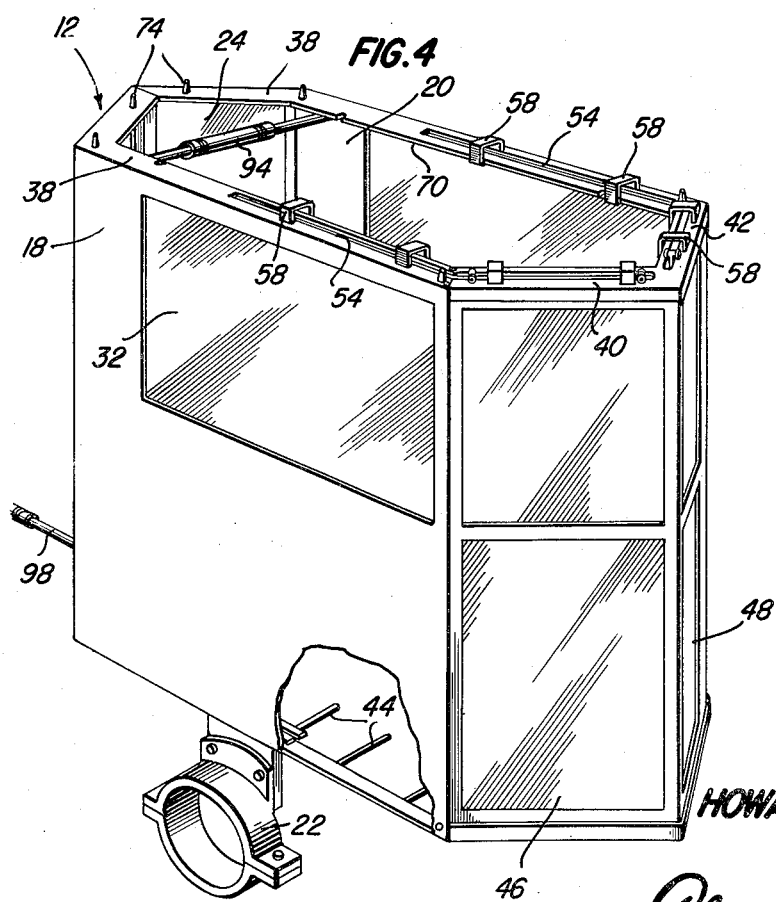
Inventor
HOWARD SANDEN
By *Clarence A. O'Brien*
*and Harvey B. Jacobson*
Attorneys

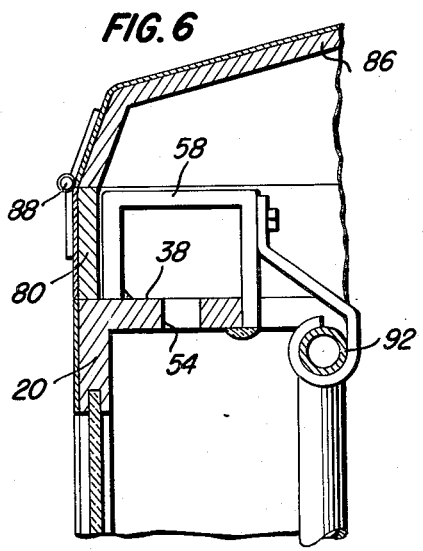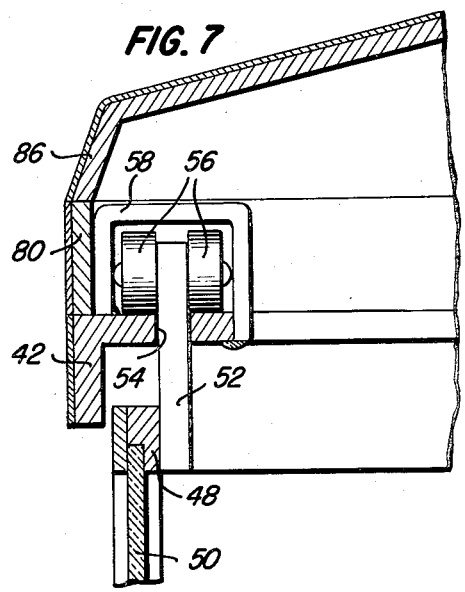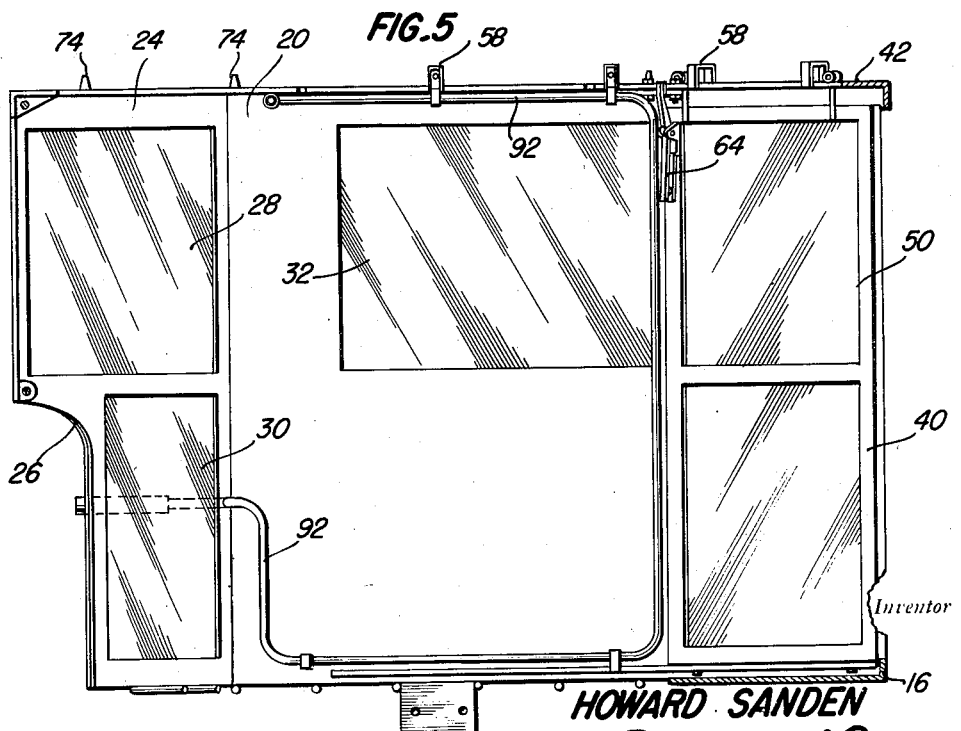

Patented Dec. 5, 1950

2,532,948

UNITED STATES PATENT OFFICE 2,532,948

DETACHABLE TRACTOR CAB

Howard Sanden, Luverne, N. Dak.

Application November 15, 1946, Serial No. 710,190

8 Claims. (Cl. 296—28)

This invention comprises novel and useful improvements in a detachable tractor cab and more specifically pertains to a portable, sectional and removable driver's compartment which is adapted for easy mounting upon a conventional type of farm tractor and which protects, conveniences and greatly facilitates the use of the tractor by the driver thereof.

The principal objects of my invention reside in providing a sheltering housing for the driver or operator of a farm tractor, which housing shall be of sectional construction with a view to improving its portability, easy assembly and removal from the tractor, and storage during periods of non-use; which compartment is further designed to permit raising or removing of the top thereof whereby the driver of the tractor may stand as his work dictates; wherein complete visibility is afforded the driver during the use of the implement; wherein a novel and highly effective means is provided for heating the interior of the compartment by heat obtained from the engine of the tractor, during cold weather; wherein extremely simple, novel and efficient clamping means are provided for assembling the compartment upon a tractor; wherein novel and efficient door means is provided for obtaining access to the compartment; wherein a highly satisfactory latch means is provided for readily securing the doors of the compartment in any desired position.

These, together with various ancillary objects of the invention which will later become apparent as the following description proceeds, are realized by my invention, one embodiment of which has been illustrated, by way of example only in the accompanying drawings, wherein;

Figure 1 is a perspective view of a tractor showing my invention applied thereto;

Figure 2 is a top plan view of the removable compartment, the top portion thereof being removed in order to further illustrate details;

Figure 3 is a perspective view from beneath, of the removable cover of the compartment;

Figure 4 is a perspective view of the compartment with the cover removed, parts being broken away to show the interior construction thereof;

Figure 5 is an interior elevational view of one section of the compartment;

Figure 6 is a fragmentary detail view, taken in vertical transverse section substantially upon the line 6—6 of Figure 2;

Figure 7 is a fragmentary detail view being taken in transverse vertical section substantially upon the section line 7—7 of Figure 2;

Figure 8 is a fragmentary detail view taken in transverse vertical section substantially upon the section line 8—8 of Figure 2; and, Figure 9 is a fragmentary detail view showing a portion of the construction.

In the accompanying drawings, wherein like numerals indicate similar parts throughout the various views, 10 designates generally a conventional type of farm or garden tractor, it being understood that my invention in all its principles is equally applicable to any type of tractor. As indicated generally at 12, the invention embodies a compartment or cab having a removable top indicated generally at 14 and which is adapted to be secured upon the frame of a tractor in a position to completely enclose the driver of the vehicle and protect him from the inclemencies of the weather during use of the vehicle.

As shown in Figure 2, a horizontally disposed metal plate 16 of generally triangular shape, with its apex extending rearwardly of the tractor, is secured in any suitable manner upon the frame of the vehicle, and preferably in a horizontal plane about 10" above the draw bar of the vehicle. In this position, the plate 16 constitutes a convenient step for the operator when entering or leaving the compartment, and also constitutes an extension of the floor of the compartment as set forth hereinafter. The apex of the triangular plate 16 terminates in proximity to the end of the tractor draw bar, whereby it will not interfere with the operative engagement of the latter with the tongues of drawn implements coupled thereto.

As shown best in Figures 2 and 4, the cab or compartment is formed by a pair of side members 18 and 20 each having three angularly disposed portions and being provided along a longitudinal vertical centrally disposed plane of the compartment. Depending from each of the sections 18 and 20, and suitably secured thereto, is a split clamp 22 adapted to detachably embrace a convenient portion of the rear axle housing of the tractor, for rigidly supporting and securing the cab thereon. As shown in Figures 2, 4 and 5, the side member 20 comprises a central and major panel section which is generally arranged parallel to the longitudinal axis of the tractor, and which is formed at its front end with an inwardly and angularly extending portion 24, which is cut away as at 26 to snugly fit about and conform to the contour of the hood enclosing the engine of the tractor. As shown at 28 and 30, the section 24 may be provided with windows or transparent portions 28 and 30 in order to afford the necessary visibility to the operator of the vehicle. The central panel of the section 20 is provided with a window 32 of any desired shape and size and located at any convenient position thereon.

As will be understood from Figures 2 and 4, the complementary section 18 is similar in construction to the aforementioned section 20, and at the forward end of the vehicle is detachably connected therewith by suitable detachable fastening means as the bolts 34, cooperating with connecting flanges disposed juxta-position, as at 36. The upper ends of the panels 18 and 20 are formed with integral inwardly and laterally extending flanges 38, upon which are removably supported in a manner to be set forth hereinafter, the cover assembly 14.

The rear portion of the cab or compartment is completed by an end section which as shown in Figures 2 and 4 consists of an angularly disposed framework comprising a rearwardly positioned extension of the inwardly turned flanges 38, and which converge to an apex over the apex of the metal plate 16, and which give a generally hexagonal shape to the walls of the compartment. This rearwardly extending framework has its two angularly disposed arms designated at 40 and 42 in Figures 2 and 4.

The side members 18 and 20, as shown in Figures 2 and 4, are provided with a plurality of inwardly extending pins or rods 44 which are adapted to rest upon suitable portions of the tractor such as the transmission casing or the like, for the purpose of supporting and steadying the cab thereon, and constituting support means for the floor of the cab which may be of any suitable material such as a carpet or the like, it being understood that the upper surface of the transmission casing will generally constitute the floor for supporting the operator in accordance with conventional practice, being assisted in this function by my rearwardly extending member 16.

As will be so far understood, the rear end of the cab is open and is defined by the bottom plate 16 and by the aforementioned rearwardly extending frame members 40 and 42. In order to complete the closure of this compartment, a pair of sliding doors 46 and 48, provided with any suitable windows 50 are hung from the flanges 38 and frame members 40 and 42, for sliding movement thereon to open or close the rear end of the cab. To effect this purpose, the doors 48 are supported by suitable straps 52 or the like which extend through slots 54 formed in the flanges 38 and in the frame members 40 and 42, and upon which are journaled at their upper ends, rolls 56 which straddle the slots and ride upon the flanged portions mentioned above. Preferably, suitable U-shaped reinforcing brackets 58 are rigidly attached to the flange members to laterally reinforce the slotted portions thereof, and as shown in Figures 4, 6, 7 and 8, extend above and about the rollers 56. It will, therefore, be seen that the doors may be readily slid into closed position as shown in Figure 4, or back into the compartment in their open positions by means of the beforementioned rollers and slots, it being understood that the window portions 15 of the doors are preferably so positioned that in their open position they will be disposed over the window members 32, to thereby permit visibility through the latter.

In order to enable the operator to secure the door in any desired open or closed position securely during motion of the tractor, I provide a friction brake shown best in Figure 8. To any convenient portion of the door frame I provide a bracket member 60 to which is pivoted as at 62 a lever 64, while an extending arm 66 of the bracket constitutes a hand-grip portion disposed generally parallel to the rear end of the lever 64. At its other end, the lever 64 is provided with a frictional engaging surface 68 disposed to slide upon and contact the lateral surface 70 of the flanges 38 and frame members 40 and 42. A spring 72 mounted in any suitable manner between the handle portion 66 and the rear portion of the lever 64, yieldingly urges the frictional brake surface 68 into frictional engagement with the lateral surface 70, thereby yieldingly and frictionally securing the door in any desired position along its trackway. As will be understood, it is merely necessary to grasp the parallel portions of the handle 66 and lever 64, squeeze the same against the action of the spring 72, in order to release the brake 68 and permit the door to be moved.

Attention is now directed more specifically to the construction shown in Figures 3 and 4, for an understanding of the structure and use of the cover element 14. At suitable points adjacent its front end, and at other points as desired, the flange members 38 and frame members 40 and 42 are provided with upwardly extending, conical-shaped dowel pins 74 adapted for engagement in correspondingly positioned apertures 76 in a suitable flange 78 extending inwardly and laterally upon the base portion 80 of the cover member 14. As will be seen in Figure 3, the base member extends over the entire top surface of the compartment, and the flange portion 78 is cut away as at 82 to provide clearance for the above mentioned reinforcing straps 58. As shown at 84, suitable clamp means are provided for detachably securing the base member 80 of the cover upon the top flanges of the compartment, with the flanges 78 and 38 in juxta-position. The cover 14 is further provided with a removable lid 86 which is hinged to the base portion 80 at one side thereof as at 88. By this means, when the cover member is in place on the tractor compartment, the operator may lift the lid 86, to thereby permit standing while operating the tractor, and may quickly lower the lid when it is desired to completely seal the compartment. At the same time, when the weather permits or the exigencies of the situation demand, the operator may readily remove the entire cover 14 and operate the machine with the protection afforded by the compartment 12.

It will be seen that as shown in Figures 2 and 4, the frame members 40 and 42 are formed as an integral unit which are detachably connected in any suitable manner with the side members 18 and 20. If preferred, however, the members 40 and 42 may be integrally formed upon the side members 18 and 20 respectively, and will then be detachable from each other along a vertical plane bisecting the angle formed between said members, and may be mechanically united by a detachable fastening means 90 as shown in Figure 9.

From the foregoing, it is believed that the construction, use and advantages of my invention will be readily apparent. Owing to its sectional construction, the device may be readily assembled or removed from a tractor by a single man and with a minimum of effort or labor, thereby greatly facilitating the use of the device as the character of the weather requires. At the same time, complete visibility is afforded when the device is upon a tractor, the completeness of the enclosure and protection of the driver from the inclemencies of the weather can be varied at the will and discretion of the operator, and the device is durable, of light weight and dependable in use.

In some environments and locations, it may be found preferable by the operator to provide a heating means for the interior of the compartment, as when operating the tractor in extremely cold weather. For this purpose, I provide a heating coil consisting of a pipe 92 which is provided with a detachable coupling 94 and which preferably extends one or more times about the walls of the cab or compartment, and is connected as by a coupling 96 extending through a front wall of the compartment and a hose connection 98 with the liquid cooling system, not shown, of the tractor. For convenience, one or more coils or loops of the pipe 92 may, as shown in Figures 4 and 5, and again in Figure 6, be supported by suitable brackets from the reinforcing members 58 and mounted upon the flange 38.

From the foregoing, various modifications and embodiments falling within the scope of the principles of this invention will be readily apparent to those skilled in the art, and accordingly I do not desire to limit myself to the exact construction shown and described, but may avail myself of any suitable equivalents falling within the scope of the appended claims.

I claim:

1. A detachable tractor cab comprising a pair of complementary sections joined together on a longitudinal vertical plane to define a compartment, fastening means for detachably securing the sections together, a cover removably mounted on the upper edges of the sections to enclose the compartment, inwardly extending supporting pins carried by the sections and engageable on the frame of a tractor, and split clamps carried by the sections and engageable on the rear axle housing of said tractor.

2. A detachable tractor cab comprising a pair of complementary sections, fastening means for detachably securing the sections together to form a compartment, inwardly extending lateral supporting pins carried by the sections and engageable on the frame of a tractor, clamping means suspended from each of the sections and engageable on the rear axle housing of said tractor, a cover removably mounted on the upper edges of the sections to enclose said compartment and hingedly affixed doors for said cover.

3. A detachable cab comprising a pair of sections joined together on a longitudinal vertical plane to form a compartment, fastening means for securing the sections together, a cover removably mounted on the upper edges of the sections, laterally disposed inwardly extending supporting pins carried by the sections and engageable on the frame of a tractor, split clamps depending from each of said sections and engageable on the rear axle housing of said tractor, each of said sections having door openings, doors slidably carried by the sections and adapted to close off said openings.

4. A detachable cab comprising a pair of sections joined together on a longitudinal vertical plane to form a compartment, fastening means for securing the sections together, a cover removably mounted on the upper edges of the sections, laterally disposed inwardly extending supporting pins carried by the sections and engageable on the frame of a tractor, split clamps depending from each of said sections and engageable on the rear axle housing of said tractor, each of said sections having door openings, door supporting tracks carried by the sections above the openings, doors adapted to close off said openings, and door supporting roller brackets secured to said doors and riding upon the tracks.

5. A detachable cab comprising a pair of sections joined together on a longitudinal vertical plane to form a compartment, fastening means for securing the sections together, a cover removably mounted on the upper edges of the sections, laterally disposed inwardly extending supporting pins carried by the sections and engageable on the frame of a tractor, split clamps depending from each of said sections and engageable on the rear axle housing of said tractor, each of said sections having door openings, door supporting tracks carried by the sections above the openings, doors adapted to close off said openings, and door supporting roller brackets secured to said doors and riding upon the tracks, and a manually openable door latching means carried by said doors and frictionally engageable with said door supporting tracks.

6. A detachable tractor cab comprising a pair of laterally spaced wall sections, fastening means including converging end walls on said wall sections for securing the complementary opposing ends of the sections together, a cover member detachably mounted on the upper edges of the sections, hinged lids for said cover, means for detachably securing the sections on a tractor frame to surround the seat zone of the tractor, horizontally sliding doors carried by said sections and manually operable latch means for said doors.

7. A detachable tractor cab comprising a pair of laterally spaced wall sections, fastening means including converging end walls on said wall sections for securing the complementary opposing ends of the sections together, a cover member detachably mounted on the upper edges of the sections, hinged lids for said cover, means for detachably securing the sections on a tractor frame to surround the seat zone of the tractor, horizontally sliding doors carried by said sections and manually operable latch means for said doors, said last means including tracks mounted on the wall sections, roller brackets affixed to the doors and mounted for movement on the tracks, and pivoted spring-urged levers carried by the doors and having locking ends engageable on the tracks.

8. A detachable tractor cab comprising a pair of laterally spaced wall sections, fastening means including converging end walls on said wall sections for securing the complementary opposing ends of the sections together, a cover member detachably mounted on the upper edges of the sections, hinged lids for said cover, means for detachably securing the sections on a tractor frame to surround the seat zone of the tractor, horizontally sliding doors carried by said sections and manually operable latch means for said doors, and means for spacing said wall sections apart.

HOWARD SANDEN.

REFERENCES CITED

The following references are of record in the file of this patent:

UNITED STATES PATENTS

| Number | Name | Date |
|---|---|---|
| 208,718 | Dare | Oct. 8, 1878 |
| 1,283,230 | Leonard | Oct. 28, 1918 |
| 1,314,225 | Souchek | Aug. 26, 1919 |
| 1,441,299 | Richard et al. | Jan. 9, 1923 |
| 1,844,168 | Knapp | Feb. 9, 1932 |
| 1,919,387 | Stringer | July 25, 1933 |
| 1,953,515 | Smith | Apr. 3, 1934 |
| 2,052,471 | Hula | Aug. 25, 1936 |
| 2,267,227 | Williams | Dec. 23, 1941 |

FOREIGN PATENTS

| Number | Country | Date |
|---|---|---|
| 28,499 | France | Nov. 26, 1924 |